(No Model.)
T. McCLELLAND.
CUTTING AND PULVERIZING HARROW.
No. 317,399. Patented May 5, 1885.
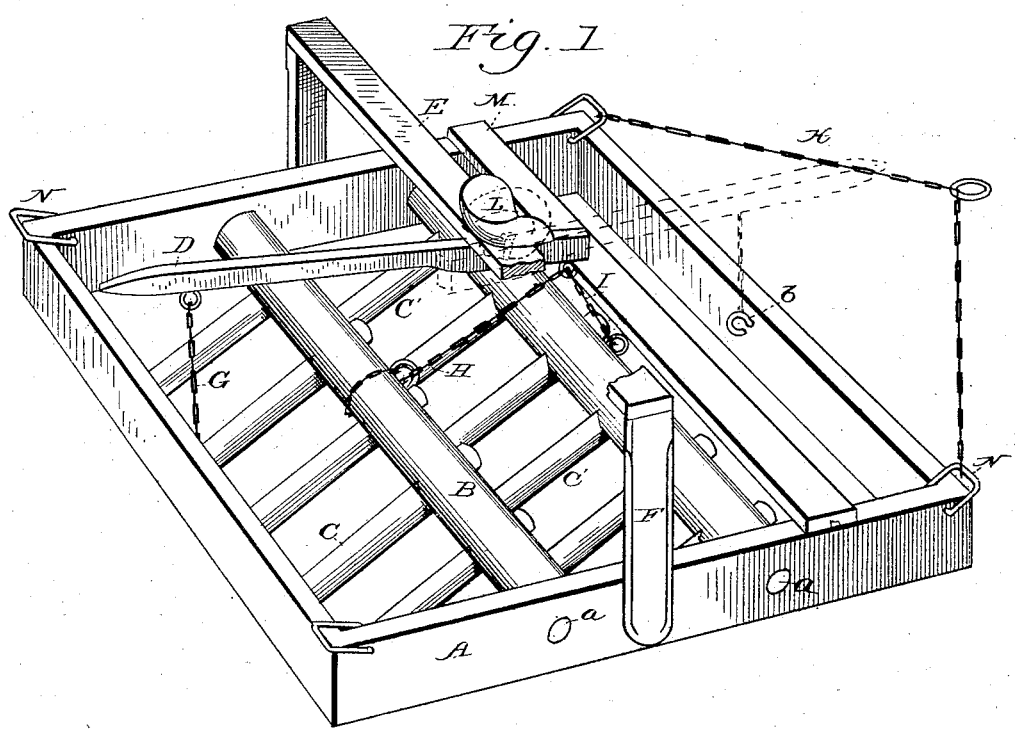
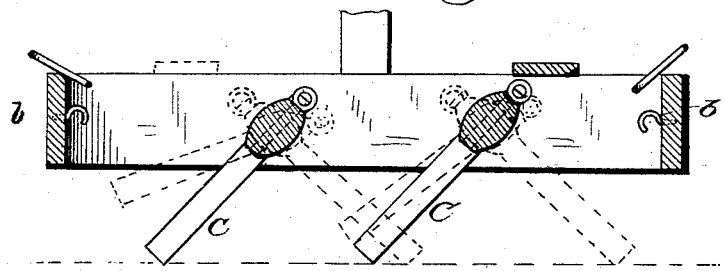
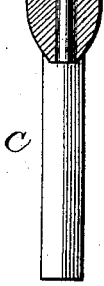 
WITNESSES: INVENTOR
Thomas McClelland
BY
O. E. Duffy
ATTORNEY

UNITED STATES PATENT OFFICE.

THOMAS McCLELLAND, OF MATTSON, ILLINOIS.

CUTTING AND PULVERIZING HARROW.

SPECIFICATION forming part of Letters Patent No. 317,399, dated May 5, 1885.

Application filed November 17, 1884. (No model.)

*To all whom it may concern:*

Be it known that I, THOMAS McCLELLAND, of Mattson, in the county of Coles and State of Illinois, have invented certain new and useful Improvements in Cutting and Pulverizing Harrows; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to the class known as "riding-harrows," and has for its object the cutting of sods, crushing of clods, and for pulverizing the ground, by which the ground is made loose and even, changing its inequalities to a level plane. It is equally adapted for a sod-cutter as well as for harrows, and will be found useful in destroying weeds and grass, the cutters arranged in such manner that they may only penetrate the soil to any desired extent. The cutters may be arranged at intervals in such manner that no two teeth shall be parallel, and thus the entire surface of the ground is gone over as the harrow advances. There may be two or more rocking cutting-bars for holding the knives, which are journaled in the side of the machine-frame. This machine will also be found very useful as a sward-cutter.

Heretofore harrows have been made to have rocking shafts, in which sharpened spikes have been used, and which tear and jag the ground upon its immediate surface; but the teeth or spikes do not penetrate the ground to any considerable extent, so that beneath the surface it is cloddy and rough, which exposes the seed and prevents it from taking root. There are another class of harrows which have teeth somewhat like cultivator-teeth, which tear and loosen the soil, but leave it in a rough condition, and still another kind that have knife-shear points, which are also objectionable. Therefore, to avoid these and other objectionable features is the object of my invention.

The invention consists in providing a frame with rocking shafts, preferably oval in cross-tion and suitably journaled in the sides of said frame. Into these rock-shafts I insert double knife-edged cutters suitably secured therein, these cutters being adapted to cut and break the sods in either direction, and which may be adjusted to any angle desired, or at varied angles with respect to each other. The rock-shafts have chains or links attached to them, which in turn are secured to a lever by a single hook or fastening, the other end of the lever being suitably secured to either end of the frame, in accordance with the direction in which the harrow is advancing. These chains are arranged in such manner as to give the cutters any desired degree of angle, either all the same or different to each other, in either direction. The cutters may be also varied in their inclination by means of the lever. This lever, which is sustained by the cross-bar upon which the seat is located, is fulcrumed near one of its ends and is capable of being reversed; but in either direction it will hold its proper relation to the cutting-bars and to its retaining end. The harrow being reversible, the seat is also reversible, as well as the cutter-bars and cutters and the sustaining-lever, all working and turning on their respective pivots.

Referring particularly to the drawings, Figure 1 is a perspective view; Fig. 2, a transverse section. Fig. 3 shows one of the cutters fixed in the bar; and Fig. 4, a cross-section of one of the cutters, showing both sharp edges.

A is the frame, which may be made in the ordinary manner.

B is the cutter-bar having journals $a\ a$ in the side of frame A. The drawings show only two cutter-bars; but there may be any required number or any number of sections, as occasion may require.

C C' represent the cutters, they being knife-edged on both edges, and which are adapted to cut in either direction in which the harrow is moving. These cutters C C' may be arranged vertically or at any desired angle, or perfectly horizontal, and are remarkably adapted to cut cornstalk, sugar-cane, stubble, and the like.

D is a lever, which is pivoted and fulcrumed to the cross-bar E in such position as to swing in either direction and still be in proper position for the attachment of the chains.

E is the cross-bar, which is supported by suitable standards, F. The bar E also supports the seat L, which is pivoted thereto and capable of turning in any direction.

G is the adjustable stay-chain, which holds the lever D in any desired position, according to the inclination of the cutters; and H I are the chains that are secured, by means of eyebolts or otherwise, to the cutter-shafts, and in turn to the fulcrum end of the lever D, by which the cutter-bars are operated.

K is the usual stretcher-chain, which in this case may be secured to either end of the harrow by clevises N.

M is a foot-board, which is loosely secured on the frame of the harrow, and when the harrow is reversed the foot-board may be also.

b is the eyebolt or hook in the frame to which chain G is secured, as shown in Fig. 2.

The dotted lines in Fig. 2 clearly show the various positions to which the cutter-bars may be arranged. When it is desired to have one set cut deeper than the others, the difference of position is shown by the dotted lines of cutter-bar C. To prevent the cutters being choked when cutting cornstalks, sugar-cane, or the like, the knife-cutters may be arranged at the angle shown by dotted lines in Fig. 2, and thus afford no resistance to the stubble in passing.

Thus it will be observed that I have produced one of the most useful farming implements of the most simple and easy construction, and which can be manipulated by any farm-hand.

The cutter-teeth may be made of any suitable material, either cast-steel, chilled malleable iron, or gray iron, as may be desired.

Having thus described my invention, what I claim is—

1. In a harrow, the main frame and oscillating cutter-bars, in combination with a reversing-lever and suitable supports for the same, and the chains H and I, substantially as described.

2. In a reversible harrow, the main frame provided with hooks b, the oscillating cutter-bars provided with suitable teeth or cutters, and also provided near the center of the same with staples, the seat-support F, the reversing-lever D, provided with bolts, each of which has an eye formed therein, in combination with the chains H, I, and G, substantially as described, and for the purpose set forth.

In testimony that I claim the foregoing as my own I affix my signature in presence of two witnesses.

THOMAS McCLELLAND.

Witnesses:
E. EVERETT ELLIS,
O. E. DUFFY.